United States Patent [19]

Steinberger et al.

[11] 3,768,903

[45] Oct. 30, 1973

[54] PHOTOGRAPHIC COPYING APPARATUS WITH ILLUMINATION CORRECTION MEANS

[75] Inventors: Siegfried Steinberger, Munich; Erich Nagel, Anzing; Werner Von Stein, Hamburg, all of Germany

[73] Assignee: Afga-Gevaert AG, Leverkusen, Germany

[22] Filed: Sept. 15, 1971

[21] Appl. No.: 180,656

[30] Foreign Application Priority Data
Sept. 18, 1970 Germany............... P 20 46 104.5

[52] U.S. Cl. ............................. 355/38, 355/41
[51] Int. Cl. ........................................... G03b 27/78
[58] Field of Search.................. 355/38, 41, 42

[56] References Cited
UNITED STATES PATENTS
3,516,741  6/1970  Thaddey ..................... 355/38 X
3,519,347  7/1970  Bowker et al................ 355/38 X
3,469,105  9/1969  Stasey ........................ 355/38 X

*Primary Examiner*—Samuel S. Matthews
*Assistant Examiner*—Richard A. Wintercorn
*Attorney*—Michael S. Striker

[57] ABSTRACT

A photographic copier in which originals copied at a copying station are first examined to determine the type of corrections to be applied to the illuminating source used in copying the original. The corrections are applied by operating personnel at an examining station in front of the copying station. A transport unit with buffer moves the originals from the examining station to the copying station. An information memory stores the corrections to be applied to the originals, until the respective original arrives at the copying station and is in position to be copied.

20 Claims, 4 Drawing Figures

Patented Oct. 30, 1973

INVENTOR
SIEGFRIED STEINBERGER
ERICH NAGEL
WERNER von STEIN

PHOTOGRAPHIC COPYING APPARATUS WITH ILLUMINATION CORRECTION MEANS

BACKGROUND OF THE INVENTION

The present invention relates to a photographic copying arrangement, and in particular to a roller type of copying machine having a preexamining station in front of the copying station suitable for examining a plurality of originals arranged on a strip or band between the stations. An arrangement is provided for applying corrections corresponding to particular properties of the individual originals, with respect to illumination characteristics that are carried out automatically. A memory arrangement stores the corrections for an original inserted in the preexamining station and then transfers the information to an illumination arrangement for the copying process.

Copying apparatus of the preceding species have shown themselves to be particularly useful for producing colored copies in which the copying light density of the individual colors is controlled, in accordance with the neutral grey principle, so that uncolored grey is essentially obtained in the copy. In view of the difficulty of distinguishing the desired colors from undesirable colored background or color noise, corrections are employed which take into account the particular properties of the originals. The continually increasing speed of the copying process through more sensitive copying material, higher light source intensity and more rapid machine handling of the copying materials, setting of the corrections in the conventional manner becomes increasingly more difficult. For example, it is difficult to examine an original and apply the required corrections within a second of timing. Upon further increasing the copying rate, such setting of corrections is no longer possible, even though such corrections are still required from the quality point of view.

It is accordingly an object of the present invention to provide an arrangement through which corrections can still be applied when high speeds are used in copying so that two originals may be copied per second. The present invention provides, thereby, a film strip upon which a whole row of originals requiring substantially similar illumination and thereby substantially similar corrections, are situated. A larger number of originals requiring no corrections are also present. With this arrangement, the examining of originals can be shortened, when only those originals are examined which require correction.

In accordance with the present invention, the preexamining station for the copying apparatus is adapted for receiving a larger number of uniformly spaced originals. Correction inputs are provided in correspondence to the number of originals, and these correction inputs are connected to a memory which stores the correction values corresponding to the insertion of the originals into the copying station, and the corrections are applied to the illuminating control arrangement.

With the apparatus of the present invention, operating personnel can handle a larger number of originals as, for example, ten originals can be simultaneously examined while stationary, and the corrections can be applied wherever required. Since, however, only a substantially small percentage of originals as, for example, 20 percent require correction, sufficient time is available for the examining person to process 10 originals at the examining station within 5 seconds. Aside from this, there is less tension on the part of the operating personnel since a resting period occurs between a short phase requiring correction and the next strip of originals arriving at the examining station.

SUMMARY OF THE INVENTION

An object of the present invention is to provide a photographic copying arrangement in which a train of originals can be passed to a copying station and the illumination at the copying station can be varied as a function of various characteristics of the originals.

Another object of the present invention is to provide an arrangement as set forth which may be operated with minimum personnel in an economical and reliable manner.

The objects of the present invention are achieved by providing a photographic copying arrangement in which the illuminating means for illuminating the originals at the copying station is controlled as a function of various characteristics of the originals to be copied. The originals enter an examining station where operating personnel scan the originals to determine what corrections or compensations are to be applied to the illuminating means for obtaining proper copies of the originals. An original transport arrangement is provided for carrying a number of the originals between the examining station and the copying station. The corrections applied by the operating personnel at the examining station are transferred to the illuminating means at the copying station for each original. A memory device connected to the correction input arrangement provided for the operating personnel, serves to store the corrections until the original is present at the copying station and is in position to be copied.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
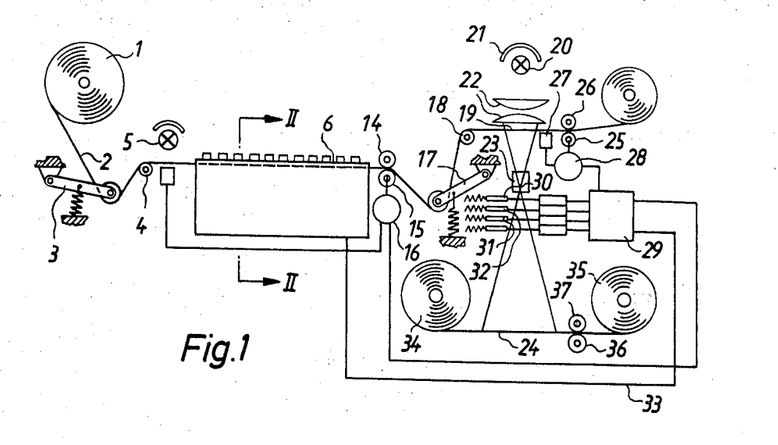
FIG. 1 is a schematic functional diagram and shows the essential elements interconnected in accordance with the principle of the present invention.

Referring to the drawing and particularly to FIG. 1, a number of original or masters to be copied are applied to a roll 1 which unreels into the strip 2. The originals or masters to be copied are provided with indexing markings in the form of, for example, perforations which are arranged in relation to the location of the image field. The spacing between the individual originals of masters on the strip 2 is made substantially constant for reasons to be described. When two different films are to be spliced for the purpose of obtaining a longer or continuous strip, such splicing is performed so that the perforations maintained their original pattern as if the film were continuous at the splice. The strip 2 is unreeled or taken from the roll 1 by a spring-loaded pivotal arrangement 3, and deflected by the roll 4 so that it passes through a sensing arrangement 5. From there, the strip passes through a preexamining stage or path 6. The sensing arrangement 5 have the capability of sensing the markings in conjunction with the images or pictures on the strip 2, as well as the marking associated with a spliced position. Such sensing may be accomplished through either photoelectric or mechanical means. The construction of such sensing arrangement is known in the art and is for this reason not further described in detail.

Figure 2:
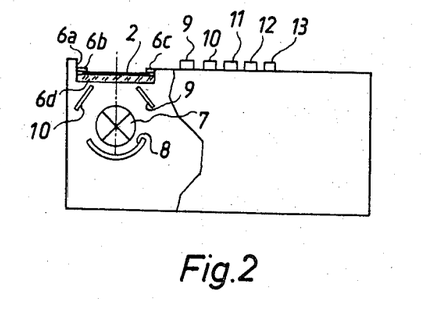
FIG. 2 is a partial sectional view of the examining station used in the arrangement of FIG. 1.

As shown in FIGS. 1 and 2, the preexamining station 6 is essentially in the form of a rectangular box which has a recess 6a at the rear of its upper surface, for the purpose of guiding the strip 2. The recess 6a is provided with holding devices 6b and 6c for the side edges of the film. A transparent element 6d is further provided. The latter serves as a transparent covering element under which a tube-shaped illuminating element 7 is situated. The light from this element 7 is distributed substantially uniformly upon the entire length of the film strip 2 along the station 6, through the reflectors 8, 9 and 10 shown in FIG. 2. From the viewpoint of the operating personnel, a number of input devices are provided for carrying out various corrections on the original or masters to be copied. For example, five exposure keys 9, 10, 11, 12, 13 are provided for each original. One of these correction keys serves, for example, as a nullifying key by which the original is not copied when the key is actuated. The other four keys can be used, therefore, to selectively apply higher or lower corrections having such magnitude stages as +4, +2, −2 and −4. The keys can also be used for establishing density corrections.

The actual copying apparatus is shown in the right hand portion of FIG. 1, in schematic form. Connecting to the preexamining station 6, are a pair of transport rolls 14 and 15, which are brought together through spring action. By driving one of the rolls 15, for example, through a motor 16 constituting first transport means, the film is conveyed or taken from the station 6 and led to a buffer storage means or slack take-up 17. This device 17 is spring-loaded for this purpose. The motor 16 can be started into operation through a control arrangement of the copying apparatus, in a manner yet to be described, and then can be stopped through a counting arrangement connected to the sensing device 5.

From the take-up device 17, the strip 2 is passed to a deflection roll 18 located at the actual copying station 19. At this copying station, the original to be copied is exposed to a light source 20 with reflector 21 and condensing lens 22 and objective lens 23. The image is transmitted from the original through this optical arrangement upon a light sensitive copying material or paper 24. The film strip 2 is stopped by stopping the film transport made of the pair of rolls 25, 26 by means of the sensing device 27 which senses visual markings on the strip 2. The strip is guided past the copying window 19, by means of the pair of rolls 25, 26. The driving motor 28 constituting second transport means for the rolls 25, 26 is turned on by the control arrangement of the copying apparatus after the exposure of the original has been terminated. The motor is again stopped through the sensing device 27.

The circuit 29 is known in the art and sets the desired copying light through three individual subtracting color filters 30, 31, 32 which are insertable into the copying light path. The corrections applied at the preexamining stage 6, are transmitted through the line 33, to the illumination control arrangement 29, when the respective original to be copied is present in the copying window 19.

In the lower portion of FIG. 1, there is shown shcematically the unwinding reel 34 and the take-up reel 35 for the copy material as well as the applicable transport rolls 36, 37.

Figure 3:
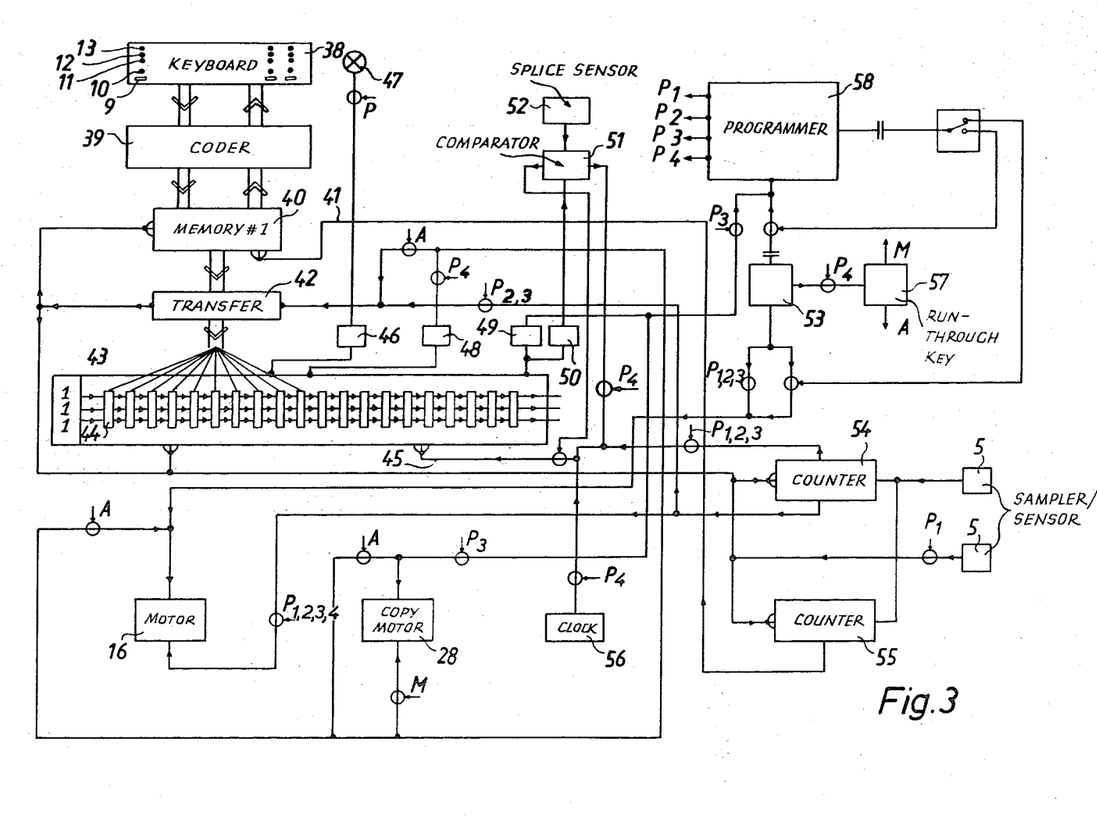
FIG. 3 is a block diagram of the arrangement of FIG. 1 using an electronic memory.

FIG. 3 illustrates the principle and concept of an electronic control means 39–58 operative for receiving and transmitting further the corrections to the illumination control arrangement of the copying means, as well as the components and circuits for carrying out the illumination program. The corrections are inserted into the keyboard 38, through keys 9, 10, 11, 12 and 13 for each original to be copied. For each original, moreover, less than five keys keys can be selected for inserting corrections. In order to simplify the processing of the information, the data is coded through the combination of three signals, since eight different elements of information can be obtained from the combination of three elements, as is known in the art. A coding arrangement 39 is provided for this purpose of coding the signals. This coding arrangement 39 is designed in the conventional manner. At the same time, the coding arrangement also includes a decoding arrangement in order to decode from a first partial storage unit 40 the inserted information from the keyboard 38 by lighting, for example, a plurality of lamps.

The first partial storage unit 40 is designed through conventional electronic storage design technique, and is composed of three flip-flops for each original to be examined in the pre-examining station 6. Accordingly, for ten originals at this preexamining station, there are 30 flip-flops.

The storage unit 40 can be fed from the keyboard 38 and the coding arrangement 39, as well as from a line 41 which transmits a special signal for indicating that a splice on the film lies within the preexamining station 6. The storage unit 40, furthermore, is connected to a transfer unit 42 which transmits to a partial storage unit or memory 43 all of the information bits or words from the storage unit 40. This transfer of information from the storage unit 40 to the partial memory 43 is performed in parallel and simultaneously so that all bits of information are transmitted simultaneously and in parallel. The transfer unit 42 is controlled through a programmer, to be described, and this unit 42 applies a clearing pulse for the first partial memory 40, and for the first 10 memory cells of the second partial memory 43. The latter is constructed in the form of a shift register which has a capacity which takes into account the capacity of the buffer storage means including the slack take-up device 17. The latter functions as a buffer device if, for example, the length of the film varies between once and twice the distance between the examining station 6 and the copying window 19, then the shift register 43 is set to double the number of originals to be copied at the examining station. Thus, when there are 10 such originals at the station, 20 storage or memory cells 44 each provided with three flip-flops is to be set aside for this purpose. Through the application of a shift pulse to line 45, the information contained within the memory is transferred one cell to the right. A clearing pulse transmitted from the transfer unit 42, serves to clear the entire shift register. Such clearing of the shift register serves to set the system to a definite starting state when a new film roll is to begin.

The illuminating control unit 29 for the copying apparatus is connected to the last storage or memory cell, whereas the first memory cell is connected to a signal emitter which provides a signal that is distinguished from the coded corrections provided by the coding unit 39, the splice position signal, and the clearing signal. Such a signal can, for example, be in the form of three bits designated as 1.

Arranged along the shift register, are sensing circuits with certain memory cells of the shift register. Such sensing circuits are located at different positions along the register. The first one of these sensors 46 determines whether the three 1 bit signals are present in the transfer from the eighth to the ninth memory cell. A warning lamp 47 is connected to the sensing device 46. This connection however, is only operative in a predetermined stage of operation of the programmer for initiating a film starting procedure. This connection operates only during the last step of the program.

A further sensing or sampling device 48 is connected between the tenth and eleventh storage or memory cells. This sampling unit 48 is connected to the transfer unit 42 under particular conditions. Finally, two sampling units 49 and 50 are provided after the twentieth memory cell. The sampling unit 49 becomes actuated by signals other than the three 1 bit signal, and thereupon turns on the copying motor 28 through a line provided for this purpose, upon insertion of a new film. The sampling unit 50 becomes actuated by the splice position signal which arrives at the memory through the line 41. The unit 51, furthermore, is connected to a comparator 51 which also receives signals from a splice position sensing device 52 at the copying window 19. The comparator 51 can interrupt the shift pulse through the line 45, as well as permit the delivering of additional shifting pulses. Components 50–56 constitute synchronizing means.

A row of programming elements is required in order to obtain an orderly and systematic execution of the copying process in conjunction with the stored corrections. This row of programming elements is connected to a starting key 53 which is connected to the motor 16. At the same time, the copying motor 28 is connected to the starting key, under predetermined conditions. Furthermore, a first counting device 54 is provided which sums or adds the pulses delivered by the sensing device 5. When the count reaches a number corresponding to the number of originals stored in the preexamining path, the counter 54 applies a signal to the motor 16 and the transfer arrangement 42. This counter also applies shift pulses to the memory 43, under predetermined conditions. The counter 54 becomes cleared through the pulse which is delivered by the transfer unit 42. A second counter 55 is provided which also receives pulses from the sampling device or splice detector means 5. This counter, 55 constitutes splice registering means and becomes cleared by the sampling device 5 upon sensing of a spliced position, under predetermined conditions, and it sets the memory 40 with information on the splice position at the proper location within this memory 40. A clock 56 is provided for the copying station, and this clock is connected for applying shift pulses through the line 45. The key 57 makes it possible to obtain an automatic run through of the film strip without actuating the starting button 53. The programmer 58 assures that the required steps in the program are carried out in accordance with the prevailing state of the starting of the film. This programmer can be constructed in the form of, for example, a stepping device which advances a cam so that the latter actuates four sets of electrical contacts in four different positions in sequence.

In operation of the arrangement shown in FIGS. 1 to 3, the beginning of a new film roll 1 which is inserted into the apparatus, is secured to a leader already in the apparatus. The starting key 53 is then actuated. The film strip then runs until the first splice position moves past the sampling or sensing device 5. In this first programming stage, all switches designated by $P_1$ are closed. As a result, the signal delivered by the sensing device 5 as a result of the splice position sensing, serves as clearing pulse by being applied to the counters 54 and 55, as well as the memory 40 and 43. At the same time, the motor 16 which serves as the feed motor is started through the starting key 53. The motor 16 then transports the film through the rolls 14 and 15, until ten picture or frame markings have passed the sensing device 5. The counter 54 has therewith attained its limit value or limit count. Once this counter 54 has reached the limit value, it applies a signal to turn the motor 16 off. During the period of time that the counter 54 is in running operation, implying the period of time during which the ten pictures or copying frames pass the preexamining station, the counter applies as many clock pulses to the shift register 43. As a result, the first 10 memory cells 44 become filled with a three 1 signal. The 10 originals to be copied at the preexamining station can be inspected and the required corrections can be set through the respective keys. As a result of the coding circuit, the corrections are inserted into the memory 40, and the indicating lamps in the keyboard 38 light up correspondingly through feedback circuits.

After the corrections have been selected, the starting key 53 is depressed again. With this action, the programmer 58 advances to the step 2. The connections designated as $P_1$ in the diagram become, thereby, open, whereas the connections designated as $P_2$ become closed. By depressing the starting key, the motor 16 starts to run again and the next 10 originals to be copied are moved again into the preexamining station. The copying motor 28 does not yet operate after the first 10 originals that were examined are still in the buffer location. The main counter 54 delivers 10 further pulses to the shift register 43, whereby of the first ten 111 signals the first reaches the last memory cell, while the second ten 111 signals occupy the first 10 memory cells. When the counter 54 attains the set value of ten, the motor 16 becomes stopped. The pulse of the counter 54 functions simultaneously to transfer the stored corrections in the memory 40 for the first 10 originals to be copied, so that these corrections are transferred into the first 10 storage cells of the shift register 43. The 111 signals become thereby replaced in the memory, since another signal is inserted into each cell of the memory 40 even when the correction keys are not depressed. This transfer operates, on one hand, for clearing the counter 54, as well as the memory 40. The memory 43 receives now in the first 10 memory cells, the corrections for the 10 originals which are present in the buffer area. The next 10 originals at the preexamining station can now be examined and the corresponding corrections can be set.

If, thereafter, the starting key 53 becomes again depressed, the programmer advances to stage 3. All connections designated $P_3$ become, thereby, closed, whereas all remaining connections remain open. The starting key 53 causes again the motor 16 to be turned on, and the third group of 10 originals to be copied is brought into the preexamining station. The second group of ten originals to be copied is led into the storage means or buffer area, so that now 20 originals to be copied are in the buffer and the first original reaches the copying station. The actuation of the starting key, furthermore, has caused the copying motor to start after the sensing unit 49 has sensed a signal other than a 111 signal in the last memory cell of the memory unit 43. As a result, the first copying process can now take place. After the third group of ten originals has entered the preexamining station, the contents of the memory unit 40 become transferred through the counter 54, into the storage cells 1 to 10 of the shift register. The pulse of the sensing unit 49 advances, furthermore, the programmer 48 to the stage $P_4$. The normal operating position is thereby attained. If, now, the correction for the third group of 10 originals is set, the information in the shift register is shifted continuously towards the right, through clock pulses at the copying station 56. The last of the corrections becomes, thereby, followed by 111 signals. If the first one of these reaches the transfer from the eighth to the ninth memory cell, the sensing device 46 becomes actuated and the warning lamp 47 becomes briefly lighted. The operating personnel becomes thereby alerted to the condition that the time available for setting corrections is almost over. After two further clock pulses applied to the line 45, the first 111 signal reaches the transfer from the tenth to the eleventh memory cell. In the position A of the key 57, all connections designated by A are conducting, and the sensing unit 48 allows the transfer of the contents of the memory 40 into the shift register, without any further action on the part of the operating personnel. A fully automatic operation is thereby attained, since the operating personnel only insert the required corrections into the keyboard 38, whenever necessary.

Interferences which may be incurred during the time that the film is run through, may cause the precise synchronization between the flow of corrections and the originals to be copied to the copying station 19 to break down. Any such error is of much consequence, since all corrections are then applied to the wrong original, and could be applied for the entire length of the loop in the buffer 17. An automatic testing is, however, possible through the splice position sensing device 5 which provides a predetermined signal through the counter 55 into the memory 40; the splice has the full length of a normal frame or original. This predetermined signal must be established through the sensing unit or "splice" signal detector means 50, simultaneously with the signal emitted by the splice sensing device at the copying window 19. The comparator 51 serves as compensation means so that the time delay of the splice position signal at the end of the memory 43 in relation to the splice position recognition in the copying station provides for shift pulses through the line 45 to be applied to the shift register, until proper synchronization is reestablished. In the case of a delay of the splice position signal from the copying station in relation to the signal from the memory 43, the shift pulses become blocked until the two splice position signals coincide again in time, under simultaneous further progressing of the copying process. In this manner, the synchronous operation at each splice position is tested and corrected, when required.

It is also possible not to apply any individual splice position signal to the memory, but instead only the number of required steps for running through a splice position on the sensing unit 5 until reaching the copying station. This number is then compared with the number of transport steps normally required for the originals to be copied.

Figure 4:
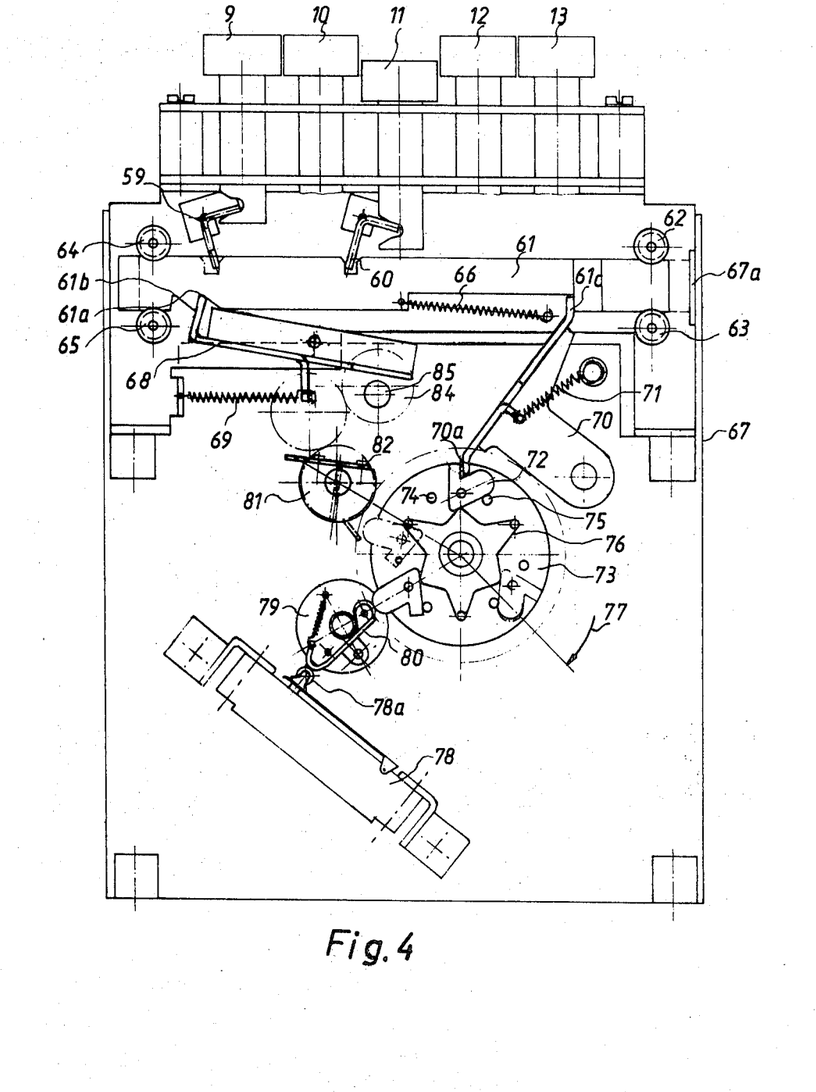
FIG. 4 is a plan view of a mechanical memory used in conjunction with the arrangement of FIG. 1.

In place of the electronic memories, it is also possible to use mechanical types of memories in accordance with the design of FIG. 4. The keys for the corrections 9 to 13 actuate, in this case, angled levers 59, 60 in the conventional manner. These angled levers reach in two notches of a slider 61 which is movable against a spring 66 by rolling, substantially frictionless, on the rollers 62, 63, 64 and 65. For the purpose of reducing the quantity of information to be stored, only three transfer levers 70 are again provided for five correction keys. These three levers 70 reach into a number of five sliders 61, in accordance with the coding arrangement. The sliders assume two predetermined positions of which the deflected position is shown in the drawing. The other position corresponds to that in which the slider 61 lies against the right housing wall 67a of the housing. In the deflected position, the sliders 61 are held by stop levers 68 which reach into cutouts 61a on the slider 61, through the action of springs. If, as shown in the drawing, a slider 61 becomes displaced towards the left through the actuation of the key 11, and by means of the angled levers 60, then the stopping lever 68 drops into the cutout 61a and holds thereby the slider in this position. The arrangement is, furthermore, constructed in the conventional manner so that when one of the other keys 9, 10, 12, 13 are actuated or depressed, the key 11 is released and the slider 16 is returned to the right-hand position.

Below the slider 61, a transfer lever 70 is rotatably mounted, and abuts a control edge 61c of the slider, as a result of the action of the spring 71. In the position of the slider 61 shown in the drawing, this lever 70 is positioned in the path of a tipping lever 72, with its projection 70a. The lever 72 is rotatably mounted on a roll-shaped member 73 between two end positions within which the lever 72 is movable. These end positions are determined by stop pins 74 and 75. The lever 72 is in contact with a star-shaped member in the form of an over dead center spring 76 which causes the lever 72 to press against one of the two stop pins 74, 75. 30 such tipping levers 72 are provided on the circumference of the rolls 73 and on three axles or shafts in the direction of the roll axis. Each of the levers 72 serves to store one bit or one unit of information. The bearing or pivot points of the tipping levers 72 are displaced from each other by 120°. When the roll 73 is advanced in the direction of the arrow 77, the projection 70a of the lever 70 holds the tipping lever 72 fixed in position, and brings it into its other end position. The rounded portion of the lever projects then over the periphery of the roll 73 and may be sensed as an information carrying element.

For sensing purposes, each of the levers 72 is provided with a switch 78, such as a microswitch. Three of these switches are present in the direction perpendicular to the plane of the drawing corresponding to a number of levers 72 in one line, for each original in the preexamining station. Between the projections of the levers 72 to be sensed and the switch actuator 78a, a sensing control roller 79 is provided. A transfer lever 80 is pivotally mounted along the edge of this roll 79, and is held against the force applied by a spring. If the lever 72 is deflected, then it turns the transfer lever 80 in a counterclockwise manner, so that the other arm of the lever 80 contacts the roller or actuator 78a of the switch and actuate this element.

Only three transfer levers 80 are mounted on the sensing control roll 79. These levers serve for sensing the corrections applicable to an original. The bearing or pivot axis of the lever for the next original is displaced relative to the previous one by one-tenth of the circumference of the roll, or 36°. The transfer lever for the third original is then displaced a still further 36° from the previous lever.

A clearing unit is still further arranged between the sampling station and the input position. This clearing unit is in the form of a rotatable roller 81 upon which a cam 82 is arranged. The roller 81 is coupled to the roller 73, by means of a gear train having a gear ratio of 3 : 1. If, now, the roller 73 is advanced, the cam 82 comes into contact with parts of the lever 72 projecting from the rim surface of the roller 73. The levers 72 become thereby returned into the other position as a result of the higher rim speed. In this other position of the lever 72, they do not project beyond the periphery of the roller. A further roller 84 is also connected to the roller 81, through an intermediate gear, for example. The roller 84 has an eccentrically located pin 85 which deflects the stopping lever 68 so that the slide 61 is returned to its initial position, through the action of the spring 66.

In operation of the memory device of FIG. 4, a correction applicable to an original present at the preexamining station is inserted by, for example, depressing the key 11. The slider 61 is moved, thereby to its deflected position, through the angled lever 60. The edge 61c takes along the transfer lever 70 into a position in which the projection 70a reaches into a tipping lever 72. In this phase of operation, the correction is stored through the stopping or locking lever 68, but the correction cannot be cleared. If, now, another key is depressed, and the slider corresponding to this key is brought into its initial position, then the tipping lever 72 also remains in its initial position. First when the roller 73 becomes advanced, a situation which corresponds functionally to the transfer of the corrections from the memory 40 into the storage units 43 and 53, do the levers 72 become transferred in position and held in that position through the spring 76. After reaching a position upon rotation of 120°, the corrections are not, as yet, needed, since the corresponding originals are still in the first half of the buffer. After a further transfer pulse, after which the corrections for the next ten originals have been inserted, the roller 73 rotates a further 120°, and becomes located in the sensing position. If, from this point on, the lever 80 is the first one of thirty successively located levers, then this lever transfers the first information unit regarding the correction for the first original of this group of ten originals, to the switch 78. At the same time, two additional transfer levers 80 which are behind that one, serve to deliver the two remaining corrections. After termination of the original associated with these corrections, the roller 80 becomes advanced by 36°, so that the next three levers 80 come into contact with the tipping levers 72 and the associated microswitches. In this manner, the roller 80 executes a complete revolution during the ten originals. The termination of the rotation serves to release through conventional means as, for example, cam means, a rotation of the roller 73 by 120°. As a result, the transferred tipping levers 72 are returned to their initial position through the cam 82, and the depressed keys become also released through the eccentric 85. The keys released by the eccentric, clear information on corrections applicable to originals which are behind two groups of ten which are also cleared by the cam 82.

In place of the electronic and mechanical memories described above, it is also possible to use other conventional memories, particularly those that may be cleared as, for example, magnetic tape or magnetic cores.

It is also not necessary that all correction keys be provided for each original. When using two hands, it is sufficient when an addressing key is provided adjacent the original, for one hand, and a set of correction keys is provided for the other hand. This second key can be either depressed simultaneously or subsequently with a self-holding mechanism.

It will be understood that each of the elements described above, or two or more together, may also find a useful application in other types of photographic copying apparatus differing from the types described above.

While the invention has been illustrated and described as embodied in photographic copying apparatus, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A copying arrangement, comprising in combination a copying station including copying means for copying originals; an examining station for placing a batch of $n$ originals to be copied simultaneously on view for visual inspection by an operator; exposure-correction setting means at said examining station for setting exposure-correction values for originals viewed at said examining station; storage means for storing originals to be copied; first transport means for transporting batches of $n$ originals periodically and with a first frequency through said examining station for batchwise inspection and thereafter into said storage means; second transport means for transporting originals numbering less than $n$ periodically and with a second higher frequency from said storage means into said copying station; and control means cooperating with said setting means for applying said exposure-correction values to said copying means in coordination with the arrival at said copying station of the respective originals associated with such values.

2. The copying arrangement as defined in claim 1 including sensing means at the entrance of said examining station for sensing the passage of said originals into said examining station; counter means connected to said sensing means and counting the number of originals sensed by said sensing means; and stopping means connecting said counter means to said first transport means for stopping the latter when a predetermined number of originals have been sensed by said sensing means.

3. An arrangement as defined in claim 1, wherein said exposure-correction setting means comprises n distinct setting means located at said examining station and spatially disposed in correspondence to the disposition of originals displayed at said examining station.

4. An arrangement as defined in claim 2, including second counting means for counting the number of originals passing into said copying station; and means connecting said second counting means to said first transport means for re-initiating operation of the latter when a predetermined number of originals have passed into said copying station.

5. An arrangement as defined in claim 3, wherein said control means comprises a first memory connected to said n distinct setting means, operative during the stay of one batch of originals at said examining station, for registering the respective exposure-correction values in individually resettable manner, whereby to permit rectifying of wrongly set values during the stay of the respective batch at said examining station, and also a second memory, operative at the end of the stay of a batch at said examining station, for registering the exposure-correction values registered in said first memory and for subsequently transmitting such values to said copying means in coordination with the arrival at said copying means of the respective originals associated with such values.

6. The copying arrangement as defined in claim 5 wherein said values are transferred in parallel from said first memory to said second memory, said transfer taking place so that all values are transferred simultaneously.

7. The copying arrangement as defined in claim 5, said second memory having a memory capacity corresponding to the capacity of said storage means.

8. An arrangement as defined in claim 5, wherein said control means comprises electronic logic circuitry, said second memory being a shift register, and means for triggering said shift register once each time an original is copied by said copying means.

9. An arrangement as defined in claim 8, wherein said shift register comprises a plurality of memory units arranged in succession, and wherein said control means further comprises means for causing the first of said shift register memory units to register a value distinguishable from said exposure-correction values.

10. An arrangement as defined in claim 9, the originals to be copied being arranged in strips connected by splices to form longer strips, and said first memory having n memory cells; and further including synchronizing means comprising splice detector means at said copying station for detecting the arrival of a splice, splice registering means, operative when a splice is located at said examining station, for causing a respective one of said memory cells of said first memory to register a "splice" value representative of the existence of a splice, and "splice" value detector means responsive to registration of a "splice" value by the last memory cell of said shift register.

11. An arrangement as defined in claim 10, said synchronizing means further comprising compensation means for terminating triggering of said shift register when the last memory cell of said shift register registers a "splice" value without said splice detector means detecting the arrival of a splice, and for effecting additional triggering of said shift register when said splice detector means detects arrival of a splice without registration of a "splice" value by the last memory cell of said shift register.

12. An arrangement as defined in claim 11, wherein said compensation means is further operative for overriding any exposure-correction values applied to said copying means when said last cell of said shift register registers a "splice" value without said splice detector means detecting the arrival of a splice.

13. An arrangement as defined in claim 10, wherein said splice registering means includes auxiliary counting means operative for counting the number of originals entering said examining station from the time of entry of a splice until the stopping of said first transport means by said stopping means.

14. An arrangement as defined in claim 5, wherein said control means is mechanical and wherein said first memory comprises a slider operatively connected to and activated by said exposure-correction setting means and a set of first levers connected to said slider and assuming any of a plurality of positions corresponding to the setting of said exposure-correction setting means, and wherein said second memory comprises a plurality of mechanical bistable elements each being movable into one of its two stable positions by a respectively associated one of said first levers.

15. An arrangement as defined in claim 14, wherein said bistable elements comprise pivoting levers and spring means for maintaining each of said pivoting levers in either one of two stable positions.

16. An arrangement as defined in claim 14, wherein said storage means is capable of accommodating $2n$ originals, and wherein said bistable elements are arranged in groups of three on coaxial rotating disks and spaced apart on each disk by angles of 120°.

17. An arrangement as defined in claim 16, wherein said coaxial rotating disks and first transport means are so connected that when a batch of n originals is moved out of said examining station, said rotating disks turn by 120° and said first levers effect a change of position of at least some of the bistable elements located on the respective 120° of the coaxial disks.

18. An arrangement as defined in claim 16, wherein said control means further includes mechanical read-out means including a plurality of microswitches arranged to be activated by those of said bistable elements which occupy respective predetermined ones of their respective pairs of stable positions.

19. An arrangement as defined in claim 18, wherein said control means further comprises mechanical clearing means including a rotating cam located proximal to the circumference of said coaxial rotating disks and operative during rotation of said coaxial disks for returning said bistable elements to predetermined ones of their respective pairs of stable positions as said elements pass by said clearing means.

20. An arrangement as defined in claim 19, wherein said mechanical clearing means further includes a transmission gear connecting said rotating cam and said coaxial rotating disks, and an eccentric cam arrangement operative for effecting a return of said slider to its unactivated position.

* * * * *